United States Patent
Naito et al.

(10) Patent No.: US 7,821,674 B2
(45) Date of Patent: Oct. 26, 2010

(54) IMAGE PROCESSING APPARATUS, IMAGE FORMING APPARATUS, INFORMATION EMBEDDING METHOD, AND INFORMATION EMBEDDING PROGRAM

(75) Inventors: Koji Naito, Toyohashi (JP); Hideyuki Hashimoto, Toyokawa (JP); Hiroyuki Ideyama, Toyokawa (JP); Katsuhisa Toyama, Toyokawa (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 1371 days.

(21) Appl. No.: 09/820,688

(22) Filed: Mar. 30, 2001

(65) Prior Publication Data

US 2001/0028727 A1 Oct. 11, 2001

(30) Foreign Application Priority Data

Mar. 30, 2000 (JP) .............................. 2000-095371
Feb. 20, 2001 (JP) .............................. 2001-043789

(51) Int. Cl.
*H04N 1/40* (2006.01)
*G06F 15/00* (2006.01)
*G06K 1/00* (2006.01)

(52) U.S. Cl. ..................................... 358/3.28; 358/1.18
(58) Field of Classification Search .................. 358/1.9, 358/3.28, 401, 1.18; 382/100
See application file for complete search history.

(56) References Cited

U.S. PATENT DOCUMENTS

| | | | | |
|---|---|---|---|---|
| 3,760,159 A * | 9/1973 | Davis et al. | .................... | 345/55 |
| 5,987,127 A * | 11/1999 | Ikenoue et al. | .............. | 358/401 |
| 6,055,321 A * | 4/2000 | Numao et al. | ................ | 382/100 |
| 6,215,421 B1 * | 4/2001 | Kondo et al. | ................... | 341/50 |
| 6,243,480 B1 * | 6/2001 | Zhao et al. | ................... | 382/100 |
| 6,334,187 B1 | 12/2001 | Kadono | | |

(Continued)

FOREIGN PATENT DOCUMENTS

JP 04-343568 11/1992

(Continued)

OTHER PUBLICATIONS

Notification of Reasons for Refusal issued in corresponding Japanese Patent Application No. 2001-043789, dated Sep. 4, 2007, and translation thereof.

(Continued)

*Primary Examiner*—James A Thompson
(74) *Attorney, Agent, or Firm*—Buchanan Ingersoll & Rooney PC

(57) ABSTRACT

An image processing apparatus includes a detecting unit that detects pieces of additional information embedded in image data, an analyzing unit that analyzes the detected pieces of additional information, and an embedding unit that (a) updates, when the analyzing unit analyzes that any of the detected pieces of additional information includes predetermined information, the predetermined information included in the piece of additional information, and embeds the updated predetermined information into image data at a location where the predetermined information is originally embedded, or (b) embeds, when the detected pieces of additional information do not include the predetermined information, a new piece of additional information including updated information, into the image data at a location that does not overlap locations where the detected pieces of additional information are embedded, the updated information being equivalent to the predetermined information.

25 Claims, 6 Drawing Sheets

U.S. PATENT DOCUMENTS

| | | | |
|---|---|---|---|
| 6,577,746 B1 * | 6/2003 | Evans et al. | 382/100 |
| 6,834,110 B1 * | 12/2004 | Marconcini et al. | 380/239 |
| 6,865,747 B1 * | 3/2005 | Mercier | 725/94 |
| 7,171,021 B2 * | 1/2007 | Yoshida et al. | 382/100 |

FOREIGN PATENT DOCUMENTS

| | | |
|---|---|---|
| JP | 8-9149 | 1/1996 |
| JP | 08-88756 | 4/1996 |
| JP | 11-75055 | 3/1999 |
| JP | 2000-032253 | 1/2000 |

OTHER PUBLICATIONS

Office Action in JP 04-343568 and its English translation, Feb. 26, 2008.

* cited by examiner

INPUT IMAGE

OUTPUT IMAGE

IMAGE PROCESSING APPARATUS, IMAGE FORMING APPARATUS, INFORMATION EMBEDDING METHOD, AND INFORMATION EMBEDDING PROGRAM

This application is based on applications No. 2000-95371 and No. 2001-43789 filed in Japan, the contents of which are hereby incorporated by reference.

BACKGROUND OF THE INVENTION

1. Field of the Invention

The present invention relates to an image processing apparatus which embeds additional information in image data, and an image forming apparatus which is equipped with the image processing apparatus and forms an image according to the image data in which the additional information is embedded.

2. Related Art

Recently, in view of document management or security protection, image processing apparatuses that are capable of embedding predetermined information in an image as watermark information (such information is hereafter referred to as "additional information" as it is added to image data) have been developed. Such an image processing apparatus embeds additional information into an image when the image is outputted onto a recording sheet such as plain paper (a recording sheet onto which an image has been outputted is hereafter referred to as a "hard copy").

For example, U.S. Pat. No. 5,987,127 discloses the following copying machine. When a hard copy embedded with additional information is copied as an original, (a copy made from a hard copy is hereinafter referred to as a "secondary copy"), the copying machine extracts the additional information embedded in image data read from the original by a scanner, and analyzes the additional information to perform predetermined copy management. The copying machine updates the extracted additional information such as a copy creation date and embeds the updated additional information in the secondary copy.

As described above, when the hard copy embedded with additional information, such as a copy creation date which needs to be updated every time the image is outputted, is copied as an original, the additional information is updated and embedded in the secondary copy. This is particularly meaningful in such a case where the original is an important literary work, for which conditions such as a copy expiry date have been set, because the document management can be performed strictly by reading out the date information embedded in the secondary copy and using the read date information for judging whether another copy of the hard copy is allowed to be made.

However, when image processing apparatuses (for example, copying machines) of different manufacturers are used, or when image processing apparatuses of the same manufacturer are used but formats for embedding additional information into an image are different depending on their models, an image processing apparatus may not be able to analyze the read additional information embedded by another image processing apparatus. In such a case, additional information, such as the above mentioned date information, that needs to be updated, cannot be updated, which could undermine accurate document management thereafter. Also, even if the additional information cannot be analyzed by one image processing apparatus, there is a possibility that another image processing apparatus (for instance, an image processing apparatus of the same model as an image processing apparatus that has embedded the additional information) can analyze the additional information. Therefore, it is preferable to retain the additional information in a state where it can be utilized later.

SUMMARY OF THE INVENTION

With considerations of the above problems, the first object of the present invention is to provide an image processing apparatus that is capable of maintaining the continuity of updateable additional information embedded in an original for subsequent image output, even when the additional information embedded in the original cannot be analyzed by the image processing apparatus.

The second object of the present invention is to provide an image forming apparatus equipped with the image processing apparatus.

The third object of the present invention is to provide a method for embedding additional information that is capable of maintaining the continuity of updateable additional information embedded in image data.

The fourth object of the present invention is to provide a program that makes a computer function as the image processing apparatus.

The first object of the present invention can be achieved by an image processing apparatus including: a detecting unit that detects all pieces of additional information that are embedded in image data; an analyzing unit that analyzes the detected pieces of additional information and judges whether any of the detected pieces of additional information includes predetermined information that is updateable; and an embedding unit that (1) updates, when a judgment result of the analyzing unit is affirmative, the predetermined information included in the piece of additional information, and embeds the updated predetermined information into the image data at a location where the predetermined information is originally embedded, and (2) embeds, when the judgment result of the analyzing unit is negative, a new piece of additional information including updated information into the image data at a location that does not overlap locations where the detected pieces of additional information are embedded, the updated information being equivalent to the predetermined information.

With the image processing apparatus having this construction, the new piece of additional information that includes the updated information can be added to the image data when none of the pieces of additional information embedded in the input image data includes the predetermined information. This enables the management of the image data thereafter to be carried out easily. Furthermore, the new piece of additional information is embedded into the image data at such a location that it does not overlap other existing pieces of additional information. Therefore, the existing pieces of additional information embedded in the image data are not impaired but remain analyzable in subsequent processing of the image data.

The second object of the present invention can be achieved by an image forming apparatus equipped with an image processing apparatus that processes inputted first image data so as to output second image data, the image forming apparatus forming an image according to the second image data, the image processing apparatus including: a detecting unit that detects all pieces of additional information that are embedded in the first image data; an analyzing unit that analyzes the detected pieces of additional information and judges whether any of the detected pieces of additional information includes predetermined information that is updateable; and an embedding unit that (1) updates, when a judgment result of the analyzing unit is affirmative, the predetermined information included in the piece of additional information, and embeds the updated predetermined information into the first image data at a location where the predetermined information is originally embedded, and (2) embeds, when the judgment result of the analyzing unit is negative, a new piece of additional information including updated information into the first image data at a location that does not overlap locations where the detected pieces of additional information are embedded, the updated information being equivalent to the predetermined information, wherein the first image data embedded with the updated predetermined information and/or the new piece of additional information is outputted as the second image data.

The image forming apparatus having this construction is capable of forming an image in which updateable information is infallibly embedded, while the existing pieces of additional information are not impaired. Due to this, the continuity of the additional information necessary for the management of the image data can be maintained.

The third object of the present invention can be achieved by a method for embedding additional information in image data including: a first step of detecting all pieces of additional information that are embedded in the image data; a second step of analyzing the detected pieces of additional information and judging whether any of the detected pieces of additional information includes predetermined information that is updateable; and a third step of updating, when a judgment result in the second step is affirmative, the predetermined information included in the piece of additional information, and embedding the updated predetermined information into the image data at a location where the predetermined information is originally embedded, and a fourth step of embedding, when the judgment result in the second step is negative, a new piece of additional information including updated information into the image data at a location that does not overlap locations where the detected pieces of additional information are embedded, the updated information being equivalent to the predetermined information.

According to the method for embedding additional information, updateable additional information can be infallibly embedded in the image data, while the existing pieces of additional information are not impaired. Due to this, the continuity of the additional information necessary for the management of image data can be maintained.

The fourth object of the present invention can be achieved by a program that is executed by a computer, the program making the computer function as the following: a detecting means for detecting all pieces of additional information that are embedded in image data; an analyzing means for analyzing the detected pieces of additional information and judging whether any of the detected pieces of additional information includes predetermined information that is updateable; and an embedding means for (1) updating, when a judgment result of the analyzing means is affirmative, the predetermined information included in the piece of additional information, and embedding the updated predetermined information into the image data at a location where the predetermined information is originally embedded, and (2) embedding, when the judgment result of the analyzing means is negative, a new piece of additional information including updated information into the image data at a location that does not overlap locations where the detected pieces of additional information are embedded, the updated information being equivalent to the predetermined information.

By making a computer execute this program, the computer functions as the image processing apparatus. With this, the management of the image data is easily performed.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED EMBODIMENT

The following is an explanation of a preferred embodiment of the present invention, with reference to the drawings. The present embodiment explains a printing system constructed centering on a monochrome digital copying machine equipped with an image processing apparatus of the present invention.

(1) Construction of Printing System

Figure 1:
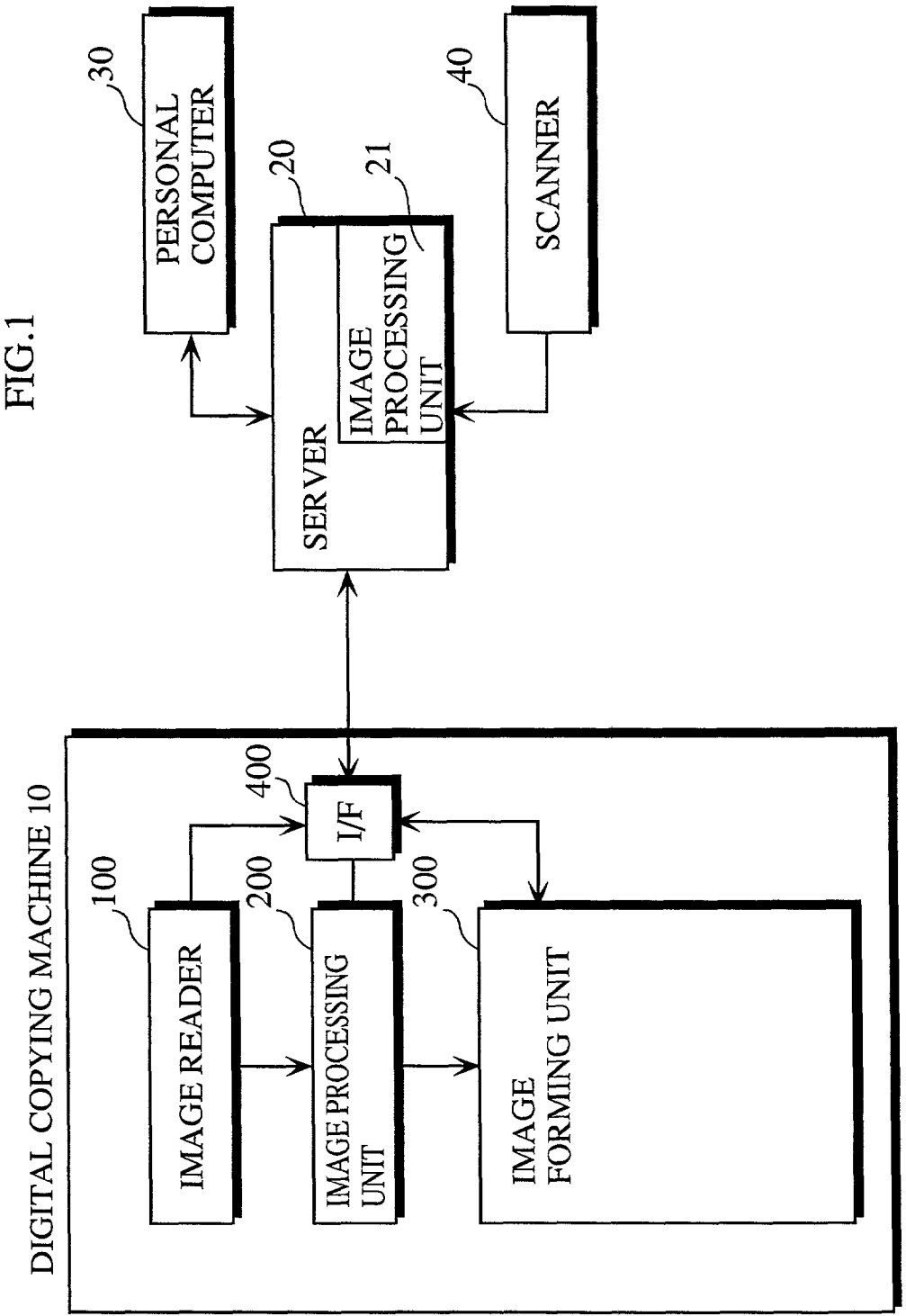
FIG. 1 is a block diagram showing an overall construction of a printing system to which the present invention is applied.

FIG. 1 shows an example of the construction of the printing system relating to the present invention.

A digital copying machine 10 is connected, through a network, to a personal computer 30 and a scanner 40 via a server 20.

The digital copying machine 10 includes an image reader 100, an image processing unit 200, an image forming unit 300, and a communication interface 400. The image reader 100 has a well-known construction that reads an image of an original placed on a platen glass using a scanner to acquire image data. The acquired image data is transmitted to the image processing unit 200. The image processing unit 200 not only performs a well-known correction operation on the transmitted image data, but also performs operations of detecting and analyzing additional information embedded in the image data, and embedding additional information into the image data.

The image forming unit 300 is of a well-known electrophotographic type, the image forming processes of which include (1) scanning the surface of a photoconductive drum with a laser beam emitted by a laser diode according to the image data processed by the image processing unit 200, to form an electrostatic latent image, (2) developing the electrostatic latent image using toner, and (3) transferring the toner image onto a transfer sheet.

The image reader 100, the image processing unit 200, and the image forming unit 300 are connected to the server 20 via the communication interface 400. Image data read by the image reader 100 can be transmitted to the personal computer 30 via the image processing unit 200. Also, image data read by the scanner 40 or image data edited by the personal computer 30 can be transmitted to the image forming unit 300 via the server 20, so as to print out such image data.

Note that the server 20 is internally equipped with an image processing unit 21 that has the same function as the image processing unit 200. With this construction, required additional information can be embedded in image data, regardless of the source of the image data in the printing system.

(2) Construction of Image Processing Unit 200

Figure 2:
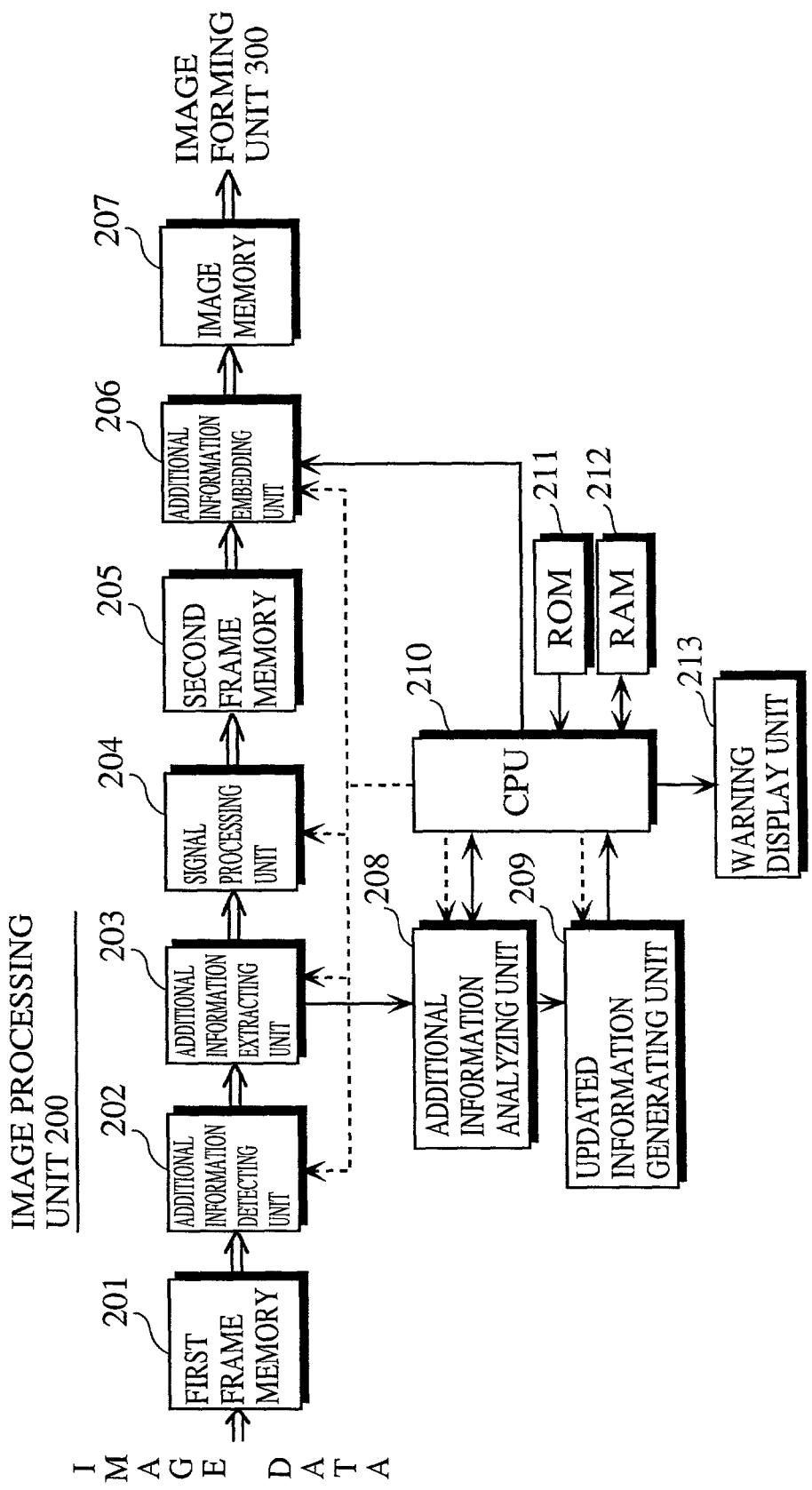
FIG. 2 is a functional block diagram showing a construction of an image processing unit in a copying machine in the printing system.

The following is an explanation of the construction of the image processing unit 200, with reference to a functional block diagram shown in FIG. 2.

As shown in the figure, the image processing unit 200 is roughly composed of a first frame memory 201, an additional information detecting unit 202, an additional information extracting unit 203, a signal processing unit 204, a second frame memory 205, an additional information embedding unit 206, an image memory 207, an additional information analyzing unit 208, an updated information generating unit 209, a CPU 210, a ROM 211, a RAM 212, and a warning display unit 213. In the figure, each large arrow represents a flow of image data, each arrow with a solid line represents a flow of data, and each arrow with a broken line represents a flow of a control signal from the CPU 210 to a functional block.

The following is an explanation of each functional block, by associating it with procedures for processing image data.

When one page of image data of an original is transferred from the image reader 100, the image data is temporarily stored in the first frame memory 201. The additional information detecting unit 202 reads out the image data, on receipt of an instruction from the CPU 210, and tries to detect additional information embedded in the image data. As one example, detecting such additional information is made in the following way. The additional information detecting unit 202 reads out pixel blocks one after another from the image data, each pixel block being composed of a predetermined number of pixels, and judges whether each pixel block includes a pattern of pixels with regularly changing density.

When the additional information detecting unit 202 detects a pattern of pixels with regularly changing density, it judges that the pattern of pixels is additional information. Following this, the additional information extracting unit 203 extracts the pattern of pixels. More specifically, the additional information extracting unit 203 extracts the pattern in the following way. When the detected pattern is a pattern of white pixels (a dot pattern) regularly arranged in a dark area such as an edge area of the image data as one example, the additional information extracting unit 203 reads its arrangement pattern, and at the same time, replaces the white pixels with pixels of the same density as neighboring pixels except white pixels. The image data from which the additional information has been extracted is then subjected to well-known correction processes, such as an edge enhancement process or a smoothing process performed by the signal processing unit 204, and temporarily stored in the second frame memory 205.

Also, the additional information extracting unit 203 transmits the additional information (the dot pattern) extracted from the image- data and its location information showing a location where the additional information has been embedded in the image, to the additional information analyzing unit 208. Here, the "location information" may be a pixel block number of a pixel block in which the additional information has been embedded, or a memory address of a specific pixel within the pixel block (for example, a pixel at a top-left corner of the pixel block). The additional information analyzing unit 208 analyzes a content of the additional information that has been transmitted by the additional information extracting unit 203.

Various methods for embedding additional information into image data have been devised. For example, when additional information shows characters, a typical method for embedding such additional information into image data is as follows. These characters are first coded according to Japanese Industrial Standard or the like, and then converted into binary codes, and the binary code information is embedded into the image data using a predetermined dot pattern.

However, a format, such as a form of a dot pattern and a size of a pixel block, for embedding additional information employed in each image processing apparatus is different, depending on its manufacturer or its model. If the format of the extracted additional information is not acceptable to the model of the present copying machine, the content of the additional information cannot be analyzed. Accordingly, the additional information analyzing unit 208 first judges whether the extracted additional information has a predetermined format acceptable to the present copying machine. If not, the additional information analyzing unit 208 judges that the additional information is not analyzable, and sends the CPU 210 a message to this effect.

When the extracted additional information has the predetermined format, the additional information is analyzable, and so the additional information analyzing unit 208 analyzes the content of the additional information. When it is updateable information, such as a copy creation date, the additional information analyzing unit 208 transmits the updateable additional information to the updated information generating unit 209. The updated information generating unit 209 updates, when it receives the updateable additional information that shows a copy creation date, the copy creation date to a present date when the copy is made. When the updated information generating unit 209 receives no updateable information, it generates updateable information in its own way, and transmits the generated updateable information to the CPU 210. When the additional information is analyzable but does not need to be updated, the additional information analyzing unit 208 transmits the additional information as its original state to the CPU 210.

The CPU 210 fetches individual information, such as an apparatus identification number set in advance for the present copying machine, from the ROM 211, and compares the read individual information with the analyzable additional information transmitted by the additional information analyzing unit 208 and by the updated information generating unit 209, to see if there is a match. If not, the CPU 210 regards the individual information as new additional information. The CPU 210 transmits the additional information (including unanalyzable additional information) transmitted by the additional information analyzing unit 208, the updated additional information transmitted by the updated additional information generating unit 209, and the individual information, each of which is associated with location information, to the additional information embedding unit 206. Here, location information is assigned to each additional information in the following way. To the additional information extracted from the image data which includes updated information, location information showing its original location is assigned. To the updated information generated by the updated information generating unit 209 in its own way, and to the individual information that is to be added as new additional information, location information showing a location that does not overlap a location where detected additional information is embedded is assigned.

The additional information embedding unit 206 reads out the image data from the second frame memory 205, and embeds additional information received from the CPU 210 into the image, at a location shown by its location information, and stores each page of the image data in which the additional information is embedded, into the image memory 207. The image data stored in the image memory 207 is transmitted to the image forming unit 300, which forms an image according to the image data.

It should be noted that the CPU 210 instructs a warning display unit 213 to display a predetermined warning when the CPU receives unanalyzable additional information, or when individual information is to be added as new additional information. Usually, a control panel (not illustrated) is equipped with an liquid crystal display unit, and so the liquid crystal display unit may be used as the warning display unit 213.

Figure 3:
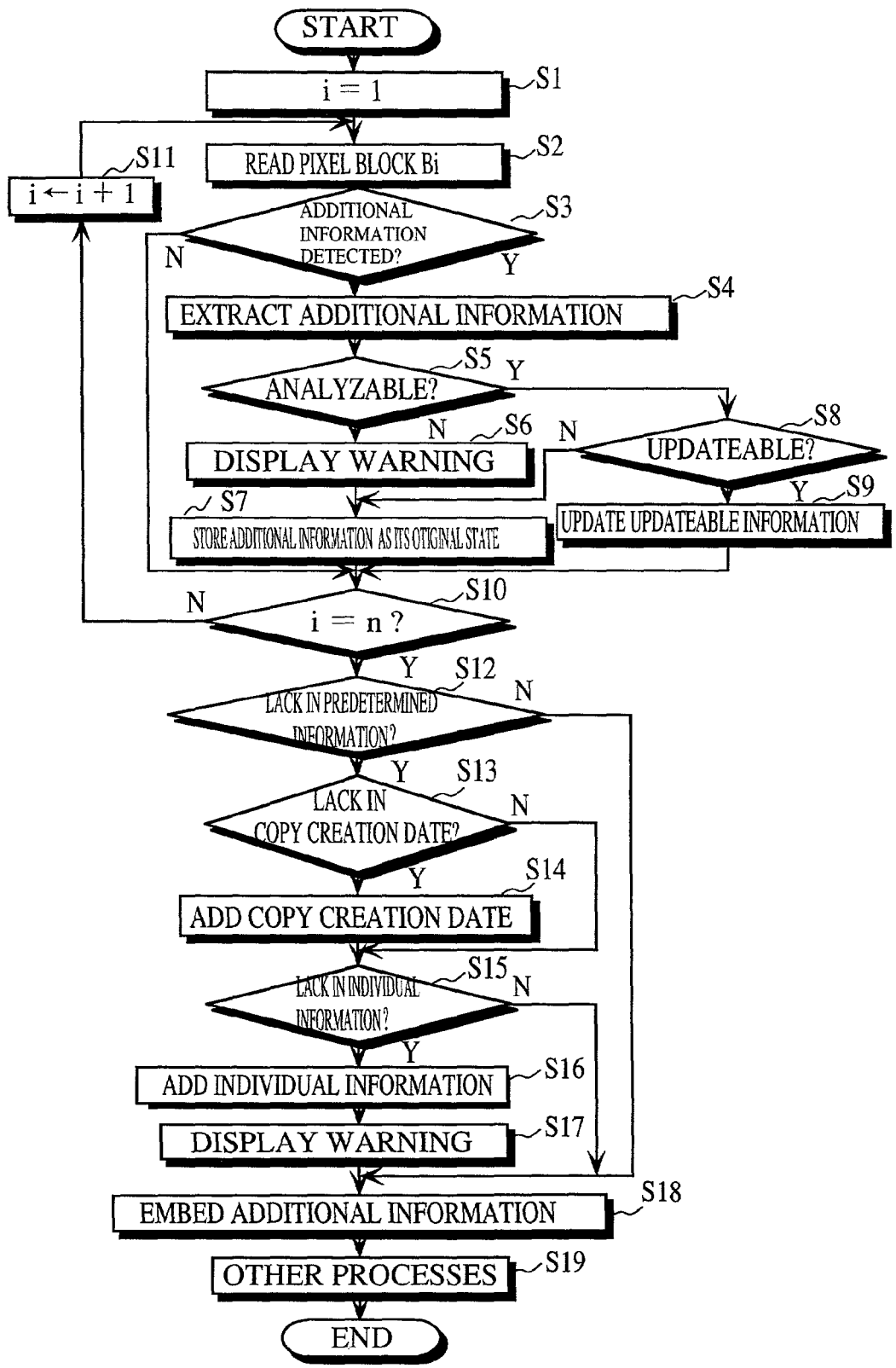
FIG. 3 is a flowchart showing an operation of the image processing unit for reading and embedding additional information.

The following is an explanation of an operation of the image processing unit 200 mainly for reading and embedding additional information, performed when one page of image data is processed as one example, with reference to a flowchart shown in FIG. 3.

First, variable i is set at 1 (step S1), and the i-th pixel block Bi is read from the image data (step S2).

Here, a pixel block is a block consisting of a predetermined number of pixels (for example, consisting of 8×8 pixels) and is a unit used for the present copying machine to embed additional information in its format. A total number "n" of pixel blocks included in the image data can be calculated using the size of the input image data. Therefore, by respectively giving the pixel blocks sequent numbers, pixel blocks B1 to Bn included in the image data can be identified.

The additional information detecting unit 202 judges whether the read pixel block Bi includes additional information (step S3), and if the above judgement result is positive, the additional information extracting unit 203 extracts the additional information (step S4), and transmits the extracted additional information along with its location information to the additional information analyzing unit 208.

The additional information analyzing unit 208 analyzes the extracted additional information transmitted by the additional information extracting unit 203 (step S5), and when the extracted additional information is unanalyzable, the additional information analyzing unit 208 instructs, via the CPU 210, the warning display unit 213 to display a warning to this effect (step S6) This warning notifies the operator that this document is a hard copy made by a copying machine of a different model. Therefore, if there is another copying machine around, the operator can stop the current copying processing and try the other copying machine to make a copy of the hard copy. This improves the user friendliness of the present copying machine.

After the warning has been displayed by the warning display unit 213, the unanalyzable additional information is stored into the RAM 212 as its original state (its dot pattern and its location information remain unchanged) (step S7). Also, in step S5, if the extracted additional information is judged to be analyzable, the additional information analyzing unit 208 judges whether the present additional information includes predetermined information that is updateable (step S8).

A list of predetermined information that is updateable in the present copying machine is stored in advance in an internal memory of the additional information analyzing unit 208, and so by referring to the list, the above judgment as to whether the present additional information includes predetermined information that is updateable can be performed. When the present additional information is judged to include the predetermined information that is updateable (step S8:Y), the updated information generating unit 209 updates the predetermined information (step S9). It should be noted here that the predetermined information that is updateable is a copy creation date (that is, a date when the present image data is created) in the present embodiment, and the updated information generating unit 209 updates the copy creation date to a present date according to an internal clock IC, and stores the updated copy creation date into the RAM 212.

If the present information does not include the predetermined information that is updateable, the processing advances to step S7, and the present additional information is stored into the RAM 212 as its original state, along with its location information.

Following this, the additional information analyzing unit 208 judges whether i=n (step S10). If not, it means that some pixel blocks remain unread, and so "i" is incremented by 1 (step S11), and the processing from steps S2 to S9 is performed on the next pixel block Bi.

In step S10, if the additional information analyzing unit 208 judges that i=n, it means that the process for detecting additional information is complete for all the pixel blocks included in the input image data, and so the additional information analyzing unit 208 judges whether the input image data lacks in specific information, in other words, whether any detected additional information includes the specific additional information (step S12). In the present embodiment, two items, (1) a copy creation date and (2) individual information such as an apparatus identification number, are set as specific information, and stored in advance in the ROM 211. In the present embodiment, even when additional information that was not analyzed includes either of the above two items (1) and (2), using another format, the additional information means nothing to the present copying machine unless it was analyzed, and therefore, the additional information analyzing unit 208 judges that the input image data lacks in the specific information. Also, in the present embodiment, a copy creation date is set as the updateable predetermined information, and at the same time, is set as the specific information.

When the input image data is judged to lack in specific information in step 12, and the specific information is a copy creation date (step S13:Y), a present date is set as the copy creation date and regarded as new additional information, and the new additional information is stored in the RAM 212 (step S14). When the specific information is individual information (step S15:Y), the individual information is regarded as new additional information, and the new additional information is stored in the RAM 212, and the warning display unit 213 is instructed to display a warning to this effect (steps S16, and S17). This warning notifies the operator that the individual information has been added as new additional information.

In step S12, when the input image data is judged not to lack in any specific information, the processing skips the steps S13 through S17, and advances to step S18.

In step S18, the additional information stored in the RAM 212 is read out and embedded into the image data.

In the present embodiment, the read additional information is embedded into the image data at its original location in principle. Accordingly, the additional information detected in step S3 is embedded into the image data at its original location as its original state, regardless that the additional information is analyzable or not. However, as for the additional information including predetermined information that is updateable, its content has been changed so as to be updated. Therefore, the updated content of such additional information is embedded in the image data at its original location.

As described above, when the additional information extracting unit 203 extracts the additional information, it associates the additional information with its location information, and the additional information and its location information are stored in the RAM 212. Therefore, the detected additional information can be embedded according to its location information.

As explained above, new additional information including specific information is added in steps S14 or S16 when the input image data lacks in the specific information. In this case, the new additional information is to be embedded in the image data at an appropriate location that does not overlap a location where the detected additional information (that is, the additional information originally embedded in the image data) is embedded.

Figure 4:
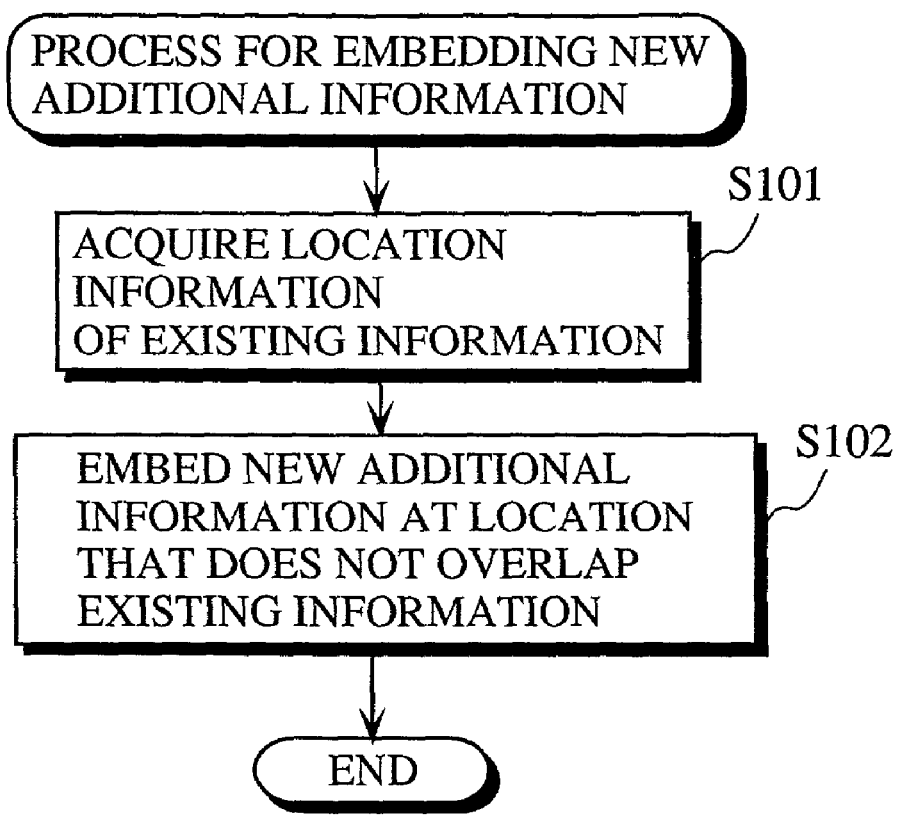
FIG. 4 is a flowchart showing a process of embedding new additional information.

FIG. 4 is a flowchart showing a process for embedding new additional information, performed in step S14 or step S16 in the flowchart in FIG. 3. For embedding the new additional information, location information for existing additional information detected from the image data is obtained in step S101. In step S102, the new additional information is embedded into the image data at a location that does not overlap a location where the existing additional information is embedded, by referring to the obtained location information.

When the process of embedding the additional information is complete in step S18, other processes are performed (step S19), thereby completing the additional information reading/embedding control operation.

Here, examples of other processes performed in step S19 are as follows. When the additional information analyzed by the additional information analyzing unit 208 is such information as "DO NOT COPY", the image forming unit 300 is controlled not to perform an image forming operation of the original, or when the additional information is such information as "IMPORTANT", the warning display unit 213 is instructed to display a message "Input Your ID", and a hard copy of the original is allowed to be made only when an ID inputted by the operator matches the number registered beforehand in the copying machine.

Here, the image processing unit 200 completes the process of extracting/embedding additional information for one page of the image data of the original, and the same processing is performed for the remaining pages of the image data of the original.

FIGS. 5A, 5B, 6A, and 6B schematically show specific examples of the content of the above described process for embedding additional information.

Figure 5A:
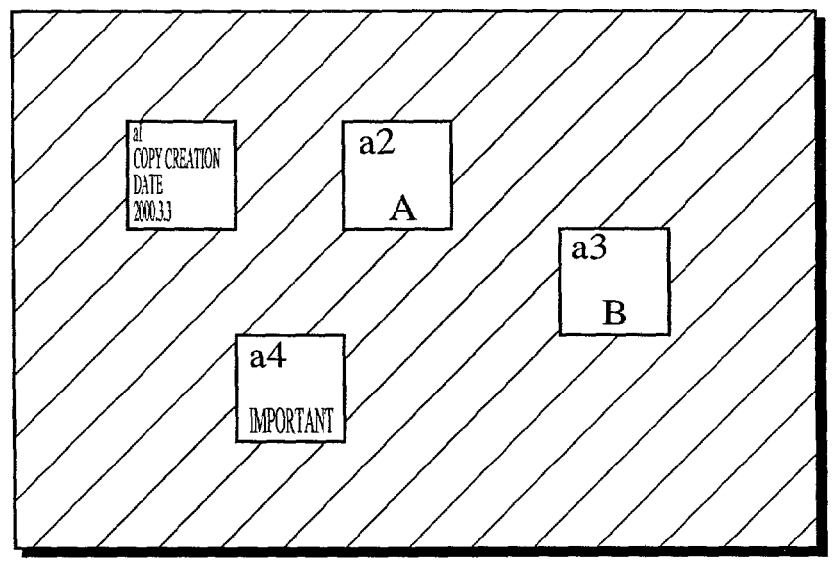
FIGS. 5A and 5B show a specific example of a process of embedding additional information.
Figure 5B:
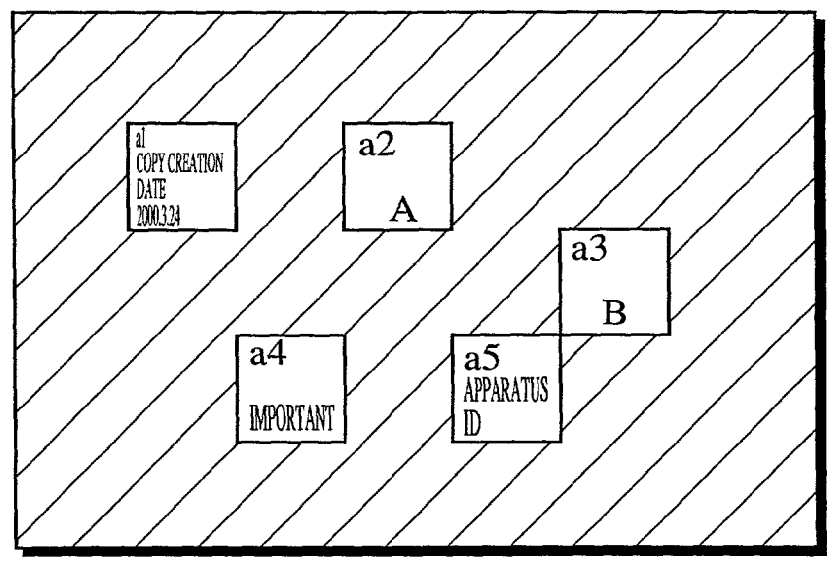
Figure 6A:
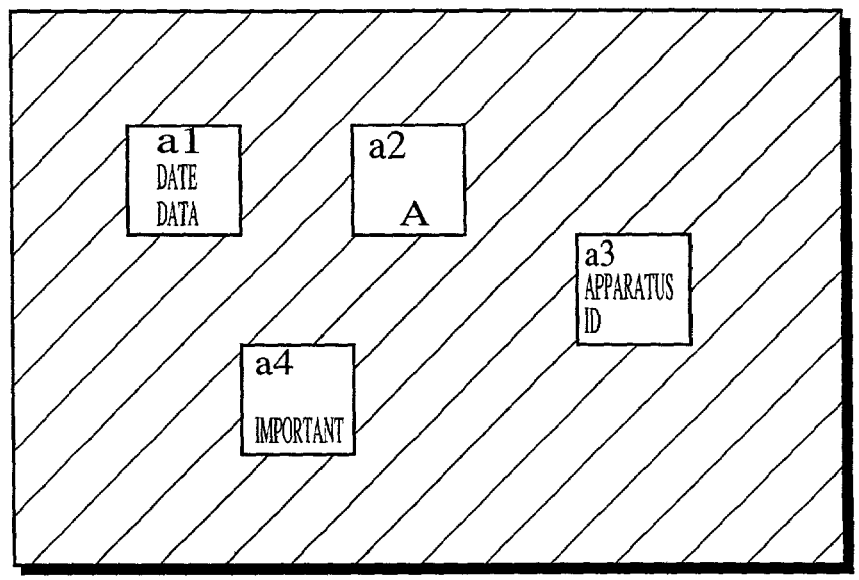
FIGS. 6A and 6B show another specific example of the process of embedding additional information.
Figure 6B:
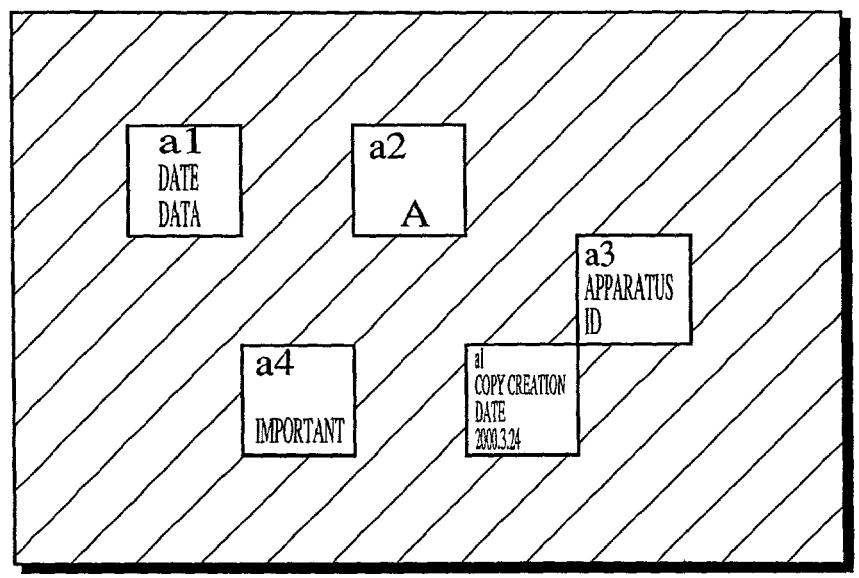

FIGS. 5A and 6A each show an input image before pieces of additional information are extracted. FIGS. 5B and 6B each show an output image after the image processing unit 200 has embedded pieces of additional information. In each figure, the shaded part is an image of an original, and each of the areas a1 to a5 of white squares is an area in which a piece of additional information is embedded.

According to the analysis result of each piece of additional information preformed by the additional information analyzing unit 208, as shown in FIG. 5A, it is assumed that the area a1 is embedded with information showing a copy creation date, the areas a2 and a3 are respectively embedded with unanalyzable additional information A and unanalyzable additional information B (A and B are embedded by a different copying machine), and the area a4 is embedded with character information "IMPORTANT" indicating that the original is an important document.

Among these pieces of additional information, only the copy creation date is updateable, and so is updated to a date when the copy is made, for example, to 2000.3.24. As other pieces of additional information are either unanalyzable ("A" and "B"), or unupdateable ("IMPORTANT"), they are respectively embedded into the image data at their original locations, as their original states (FIG. 5B) . Also, as the input image does not include an apparatus identification number of the present copying machine, the apparatus identification number is embedded as new additional information into the area a5 that does not overlap the areas a1 to a4.

The reason for embedding additional information that has been embedded in the input image at its original location as described above is that the additional information can be easily extracted when the hard copy is read by a copying machine of the same model as a copying machine that has embedded the additional information. Also, the reason for embedding unanalyzable information at its original location as its original state is that it is analyzable significant information for the copying machine that has embedded the information.

Also, according to the analysis result of each piece of additional information performed by the additional information analyzing unit 208, as shown in FIG. 6A, it is assumed that the area a1 is embedded with a kind of date information in the input image, and the area a2 is embedded with unanalyzable additional information A, the area a3 is embedded with information showing an apparatus identification number, and the area a4 is embedded with information showing "IMPORTANT".

In this case, as the apparatus identification number is embedded in the input image data, it is not necessary to add it as new information. However, the input image data lacks in information showing its copy creation date. Although the area a1 is judged to be embedded with a kind of date information, it is not clear that this date information shows a previous copy creation date (that is to say, the information is unanalyzable). This date information might be other significant date information such as an original copy creation date, and might be read by a copying machine that has embedded the date information. Therefore, it is preferable to retain this information as its original state. Therefore, in the present embodiment, information showing the copy creation date "2000.3.24" of the original is embedded in the area a5 other than the areas a1 to a4.

Basically, an area into which new additional information is embedded can be freely chosen as long as no existing additional information is embedded in the area. However, it is preferable that the new additional information is embedded into the image data at a location where the deterioration of the image quality is less distinctive. As examples of such a location, an edge area of the image or the background of the image can be considered.

In the printing system of the present embodiment, the server 20 is also internally equipped with the image processing unit 21 that has the same construction as the image processing unit 200 as shown in FIG. 1. In the image processing unit 21, the same control as explained above is performed as to extracting/embedding additional information of image data. Accordingly, the copy management based on additional information is possible even when a source of image data is the external personal computer 30, or the scanner 40. Also, even in a case where an image read by the image reader 100 is transmitted to the personal computer 30 without going through the image processing unit 200, the image must be transmitted through the image processing unit 21. Due to this, accurate copy management is performed according to the additional information, ensuring the management of important image information.

Modifications

Although the present invention has been described based on the above embodiment, the invention should not be limited to such. For instance, the following modifications are possible.

(1) In the above embodiment, the detected additional information is once extracted from the input image by the additional information extracting unit 203 and is embedded into the output image at its original location by the additional information embedding unit 206. However, in a case where the processing performed by the signal processing unit 204 does not impair a dot pattern of the additional information, or in a case where a method for embedding the additional information is so special that the embedded additional information is easily analyzed even after it is subjected to the processing by the signal processing unit 204, the additional information except updateable information may not need to be extracted, but may remain embedded. In this case, only updateable information is extracted, updated, and embedded into the image data at its original location, and new additional information such as individual information is embedded into the image data at a location that does not overlap a location where the additional information is embedded.

(2) In step S5 in the flowchart shown in FIG. 3, when additional information is unanalyzable, the warning display unit is instructed to display a warning to this effect in step S6. As this warning provides the operator with a chance to try another copying machine, the operator may press a reset key on the control panel so that the present copying machine is controlled to stop the process of making a hard copy.

(3) Although the above embodiment mainly explains a case where the image processing apparatus of the present invention is applied to a monochrome digital copying machine, it may also be applied to a color copying machine, or any image forming apparatus, such as a facsimile machine, as long as the apparatus needs to process image data.

(4) The present invention is applicable to a program that makes a computer perform the processing based on the procedures shown in FIGS. 3 and 4 in the above embodiment. In this case, the program is stored in a storage medium, such as a ROM equipped in the computer, a hard disc, a CD, and an MO, and it is read by the computer according to the necessity, and makes the computer perform the processing based on the procedures shown in FIGS. 3 and 4.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus comprising:
  a detecting unit that detects all pieces of additional information that are embedded in image data;
  a storage unit that stores the detected pieces of additional information in association with location information thereof;
  an analyzing unit that analyzes the detected pieces of additional information and judges whether any of the detected pieces of additional information includes predetermined information that is updateable; and
  an embedding unit that
  (1) updates, when a judgment result of the analyzing unit is affirmative, the predetermined information included in the piece of additional information, and embeds the piece of additional information including the updated predetermined information into the image data at a location where the piece of additional information is originally embedded, by referring to the stored location information, and
  (2) embeds, when the judgment result of the analyzing unit is negative, a new piece of additional information including updated information into the image data at a location that does not overlap locations where the detected pieces of additional information are embedded, by referring to the stored location information, the updated information being equivalent to the predetermined information.

2. The image processing apparatus according to claim 1,
  wherein when the analyzing unit analyzes the detected pieces of additional information, the analyzing unit employs a predetermined embedding format used by the embedding unit.

3. The image processing apparatus according to claim 1, further comprising,
  a warning unit that issues, when the analyzing unit finds that any of the detected pieces of additional information is unanalyzable, a warning to the effect that the piece of additional information is unanalyzable.

4. The image processing unit according to claim 1,
  wherein when the analyzing unit finds that any of the detected pieces of additional information is unanalyzable, the analyzing unit judges that the piece of additional information does not include the predetermined information.

5. The image processing apparatus according to claim 1,
  wherein the predetermined information includes information about a date when the image data is processed.

6. An image forming apparatus equipped with an image processing apparatus that processes inputted first image data so as to output second image data, the image forming apparatus forming an image according to the second image data, the image processing apparatus comprising:
  a detecting unit that detects all pieces of additional information that are embedded in the first image data;
  a storage unit that stores the detected pieces of additional information in association with location information thereof;
  an analyzing unit that analyzes the detected pieces of additional information and judges whether any of the detected pieces of additional information includes predetermined information that is updateable; and
  an embedding unit that
  (1) updates, when a judgment result of the analyzing unit is affirmative, the predetermined information included in the piece of additional information, and embeds the piece of additional information including the updated predetermined information into the first image data at a location where the piece of additional information is originally embedded, by referring to the stored location information, and
  (2) embeds, when the judgment result of the analyzing unit is negative, a new piece of additional information including updated information into the first image data at a location that does not overlap locations where the detected pieces of additional information are embedded, by referring to the stored location information, the updated information being equivalent to the predetermined information,
  wherein the first image data embedded with the updated predetermined information and/or the new piece of additional information is outputted as the second image data.

7. The image forming apparatus according to claim 6,
wherein when the analyzing unit analyzes the detected pieces of additional information, the analyzing unit employs a predetermined embedding format used by the embedding unit.

8. The image forming apparatus according to claim 6,
wherein the image processing apparatus further comprises, a warning unit that issues, when the analyzing unit finds that any of the detected pieces of additional information is unanalyzable, a warning to the effect that the piece of additional information is unanalyzable.

9. The image forming apparatus according to claim 6,
wherein when the analyzing unit finds that any of the detected pieces of additional information is unanalyzable, the analyzing unit judges that the piece of additional information does not include the predetermined information.

10. The image forming apparatus according to claim 6,
wherein the predetermined information includes information about a date when the image data is processed.

11. A method for embedding additional information in image data comprising:
a first step of detecting all pieces of additional information that are embedded in the image data;
a second step of storing the detected pieces of additional information in association with location information thereof;
a third step of analyzing the detected pieces of additional information and judging whether any of the detected pieces of additional information includes predetermined information that is updateable;
a fourth step of updating, when a judgment result in the third step is affirmative, the predetermined information included in the piece of additional information, and embedding the piece of additional information including the updated predetermined information into the image data at a location where the piece of additional information is originally embedded, by referring to the stored location information, and
a fifth step of embedding, when the judgment result in the third step is negative, a new piece of additional information including updated information into the image data at a location that does not overlap locations where the detected pieces of additional information are embedded, by referring to the stored location information, the updated information being equivalent to the predetermined information.

12. The method for embedding additional information in image data according to claim 11,
wherein when the detected pieces of additional information are analyzed in the third step, a predetermined embedding format used for embedding the piece of additional information in the fourth step and the new piece of additional information in the fifth step is employed.

13. The method for embedding additional information in image data according to claim 11, further comprising,
a warning step of issuing, when any of the detected pieces of additional information is judged to be unanalyzable in the third step, a warning to the effect that the piece of additional information is unanalyzable.

14. The method for embedding additional information in image data, according to claim 11,
wherein when any of the detected pieces of additional information is judged to be unanalyzable in the third step, the piece of additional information is judged not to include the predetermined information.

15. The method for embedding additional information in image data according to claim 11,
wherein the predetermined information includes information about a date when the image data is processed.

16. The method for embedding additional information in image data according to claim 11, further comprising,
a step of forming an image according to the image data that includes one of (a) the updated predetermined information embedded in the fourth step and (b) the new piece of additional information embedded in the fifth step.

17. A computer-readable medium containing a program that is executed by a computer, the program making the computer function as the following:
a detecting means for detecting all pieces of additional information that are embedded in image data;
a storing means for storing the detected pieces of additional information in association with location information thereof;
an analyzing means for analyzing the detected pieces of additional information and judging whether any of the detected pieces of additional information includes predetermined information that is updateable; and
an embedding means for
(1) updating, when a judgment result of the analyzing means is affirmative, the predetermined information included in the piece of additional information, and embedding the piece of additional information including the updated predetermined information into the image data at a location where the piece of additional information is originally embedded, by referring to the stored location information, and
(2) embedding, when the judgment result of the analyzing means is negative, a new piece of additional information including updated information into the image data at a location that does not overlap locations where the detected pieces of additional information are embedded, by referring to the stored location information, the updated information being equivalent to the predetermined information.

18. The program according to claim 17,
wherein when the analyzing means analyzes the detected pieces of additional information, the analyzing means employs a predetermined embedding format used by the embedding means.

19. The program according to claim 17, making the computer further function as the following,
a warning means for issuing, when the analyzing means finds that any of the detected pieces of additional information is unanalyzable, a warning to the effect that the piece of additional information is unanalyzable.

20. The program according to claim 17,
wherein when the analyzing means finds that any of the detected pieces of additional information is unanalyzable, the analyzing means judges that the piece of additional information does not include the predetermined information.

21. The program according to claim 17,
wherein the predetermined information includes information about a date when the image data is processed.

22. An image processing apparatus comprising:
a detecting unit that detects additional information that is embedded in image data;
a storage unit that stores the detected additional information in association with location information thereof; and
an embedding unit that embeds new additional information in the image data at a location that does not overlap a location where the detected additional information is embedded, by referring to the stored location information.

23. A method for embedding additional information in image data, comprising:
- a first step of detecting additional information that is embedded in image data;
- a second step of storing the detected additional information in association with location information thereof; and
- a third step of embedding new additional information into the image data at a location that does not overlap a location where the detected additional information is embedded, by referring to the stored location information.

24. A computer-readable medium containing a program that is executed by a computer, the program making the computer function as the following:
- a detecting means for detecting additional information that is embedded in image data;
- a storage means for storing the detected additional information in association with location information thereof; and
- an embedding means for embedding new additional information into the image data at a location that does not overlap a location where the detected additional information is embedded, by referring to the stored location information.

25. An image processing apparatus comprising:
- a detecting unit that detects all pieces of additional information that are embedded in image data;
- a storage unit that stores the detected pieces of additional information, the storage unit also stores location information indicating the location of where the detected pieces of additional information are embedded within the image data;
- an analyzing unit that analyzes the detected pieces of additional information and judges whether any of the detected pieces of additional information includes predetermined information that is updateable; and
- an embedding unit that
  (1) updates, when a judgment result of the analyzing unit is affirmative, the predetermined information included in the piece of additional information, and embeds the piece of additional information including the updated predetermined information into the image data at the location where the piece of additional information is originally embedded, by referring to the stored location information, and
  (2) embeds, when the judgment result of the analyzing unit is negative, a new piece of additional information including updated information into the image data at a location that does not overlap locations where the detected pieces of additional information are embedded, by referring to the stored location information, the updated information being equivalent to the predetermined information.

* * * * *